United States Patent
Carr et al.

(10) Patent No.: US 9,256,407 B2
(45) Date of Patent: Feb. 9, 2016

(54) INTERLEAVING THE XFORMS PROCESSING MODEL WITH JAVA SERVER FACES REQUEST PROCESSING

(75) Inventors: Derek W. Carr, Cary, NC (US); Carol A. Jones, Raleigh, NC (US); Ajamu A. Wesley, Concord, MA (US); Cesar A. Wong, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1913 days.

(21) Appl. No.: 11/197,072

(22) Filed: Aug. 4, 2005

(65) Prior Publication Data

US 2007/0033595 A1 Feb. 8, 2007

(51) Int. Cl.
*G06F 9/44* (2006.01)

(52) U.S. Cl.
CPC ........................................ *G06F 8/38* (2013.01)

(58) Field of Classification Search
USPC .......................................................... 717/106
See application file for complete search history.

(56) References Cited

U.S. PATENT DOCUMENTS

| | | | |
|---|---|---|---|
| 5,872,973 A | 2/1999 | Mitchell et al. | |
| 6,199,195 B1* | 3/2001 | Goodwin et al. | 717/104 |
| 6,237,135 B1* | 5/2001 | Timbol | 717/107 |
| 6,631,519 B1* | 10/2003 | Nicholson et al. | 717/169 |
| 7,080,350 B2* | 7/2006 | Saimi et al. | 717/100 |
| 7,246,134 B1* | 7/2007 | Kitain et al. | 707/102 |
| 7,404,175 B2* | 7/2008 | Lee et al. | 717/104 |
| 7,451,433 B2* | 11/2008 | Halpern | 717/106 |
| 2002/0099738 A1* | 7/2002 | Grant | 707/513 |
| 2003/0050932 A1 | 3/2003 | Pace et al. | |
| 2003/0110315 A1 | 6/2003 | Upton | |
| 2003/0149934 A1 | 8/2003 | Worden | |
| 2003/0163603 A1 | 8/2003 | Fry et al. | |
| 2003/0208505 A1 | 11/2003 | Mullins et al. | |
| 2004/0003341 A1* | 1/2004 | alSafadi et al. | 715/500 |
| 2004/0021679 A1 | 2/2004 | Chapman et al. | |

FOREIGN PATENT DOCUMENTS

WO WO 00/52596 9/2000

OTHER PUBLICATIONS

Mahmoud (Developing Web Applications with JavaServer Faces, http://www.j2ee.me/developer/technicalArticles/GUI/JavaServerFaces, Aug. 2004, retrieved on Aug. 20,2009).*

* cited by examiner

*Primary Examiner* — Hang Pan
(74) *Attorney, Agent, or Firm* — Steven M. Greenberg, Esq.; CRGO Law

(57) ABSTRACT

A method, system and apparatus for interleaving XForms with JSF request processing can be provided. The system can include an XForms definition generated for a form configured for rendering in a Web application. Specifically, the XForms definition can specify a data model for data to be processed within the form. The system further can include a JSF code generation module programmed to process the forms model to produce a form bean, a faces configuration, and a JSF page for each navigable view defined in the XForms definition.

8 Claims, 2 Drawing Sheets

INTERLEAVING THE XFORMS PROCESSING MODEL WITH JAVA SERVER FACES REQUEST PROCESSING

BACKGROUND OF THE INVENTION

1. Field of the Invention

The present invention relates to forms processing and more particularly to XForms forms processing.

2. Description of the Related Art

Form based input is the enabling technology which permits the widespread distribution of applications across generic client platforms such as the conventional content browser. In the prototypical distributed application, a markup language defined interface can form the principal conduit through which end users can interact with backend application logic. Often configured in the form of a Web page, the interface can be provided to the content browser by a content server and can take the form either of a pre-defined static page, or a dynamically generated page. Form input fields can be positioned within the interface through which user input can be accepted and posted to the backend application logic for further processing.

Despite the flexibility afforded by hypertext markup language (HTML) defined forms, HTML defined forms mix data, logic and presentation in contravention of standard programming practices. In this regard, the well-known model-view-controller paradigm demands that each of data, logic presentation remain separable. In this way, though the presentation layer may change to suit the user interface requirements of an end user, the underlying logic layer need not also change. To accommodate the increasing complexity of transactions conducted through forms, the XForms specification has been proposed as a presentation independent way of handling interactive Web transactions. Significantly, the XForms specification separates data and logic from presentation in that XForms utilizes the extensible markup language (XML) for data transport and HTML for data display.

Forms technologies are typically bound directly to a presentation specification such as the XHTML specification, the portable document format (PDF) specification and the like. Yet, currently, there is no way to integrate XForms with the Java 2 Platform, Enterprise Edition (J2EE) programming model as interactive J2EE applications assume a server side processing model often complimented with a robust MVC application framework. One such framework is the Java Server Faces (JSF) framework. Designed to be flexible, JSF leverages existing, standard user interface and web-tier concepts without limiting developers to a particular mark-up language, protocol, or client device.

The user interface component classes included with JSF encapsulate the component functionality, not the client-specific presentation, thus enabling JSF user interface components to be rendered to various client devices. By combining the user interface component functionality with customized renderers, which define rendering attributes for a specific user interface component, developers can construct custom tags to a particular client device. As a convenience, JSF provides a custom renderer and a JSP custom tag library for rendering to an HTML client, allowing developers of J2EE applications to use JSF technology in their applications.

BRIEF SUMMARY OF THE INVENTION

Embodiments of the present invention address deficiencies of the art in respect to forms processing for Web applications and provide a novel and non-obvious method, system and apparatus for interleaving XForms and JSF processing. In this regard, embodiments of the present invention provide for a declarative and non-intrusive integration of XForms and J2EE in order to achieve a rich forms processing engine. Specifically, a common form processing engine component can be provided which implements the XForms event model during the JSF processing lifecycle. As a result, Web application developers can seamlessly integrate robust forms processing into J2EE applications.

In an embodiment of the invention, a data processing system for interleaving XForms with JSF request processing can be provided. The system can include an XForms definition generated for a form configured for rendering in a Web application. Specifically, the XForms definition can specify a data model for data to be processed within the form. The system further can include a JSF code generation module programmed to process the forms model to produce a form bean, a faces configuration, and a JSF page for each navigable view defined in the XForms definition.

Optionally, the XForms definition also can include one or more bindings for data used by controls within the form with fields of the data model. Also, the XForms definition further can include statements linking actions in the form with corresponding command invocations. In another optional configuration, the form bean can include getter and setter methods for a plurality of bound elements disposed in the form. Likewise, the faces configuration can specify the form bean. Additionally, the faces configuration can include a lifecycle phase listener for forms processor integration. Moreover, the faces configuration can include navigational rules based upon navigation groups in the XForms definition. Finally, each JSF page can include a server page generated for each of the navigation groups.

In another embodiment of the invention, a method for interleaving XForms with JSF request processing can be provided. The method can include rendering a JSF request to generate a forms context for a form, registering a forms processor as a validator for at least one control in the form which has been bound to data for the form and accepting data for the form and applying control data for the accepted data. The validator can be called to perform validations on the control data for the accepted data. Subsequently, the accepted data can be applied to a model instance inside the form. In another aspect of the invention, an event can be dispatched to the forms processor through a form bean responsive to detecting an event which generates request processing. For instance, the method can include re-querying instance data and control properties through the form bean.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for interleaving XForms with JSF request processing. In accordance with an embodiment of the present invention, an XForms definition can be generated for a form to be rendered for a Web application. The XForms definition can specify a data model for data to be processed within the form and a name space for the data. The XForms definition further can bind statements for data used by controls within the form with the fields of the data model. Finally, the XForms definition can link actions in the form to command invocations.

A JSF code generation module can process the forms model to produce a form bean, a faces configuration and a multiplicity of JSF pages. The form bean can include getter and setter methods for every binding element, arbitrary data, control properties, event handler and submission in the form. The faces configuration file, in turn, can declare the managed bean for the form, a lifecycle phase listener for forms processor integration and navigational rules based upon navigation groups in the form definition. Finally, each JSF page can be a server page generated for each navigation group defined in the form. The server page can specify the initialization of the forms context and the location of the form definition, the binding of each control and its corresponding control properties in the form to the form bean, and action handlers for controls in the form with methods in the form bean.

Figure 1:
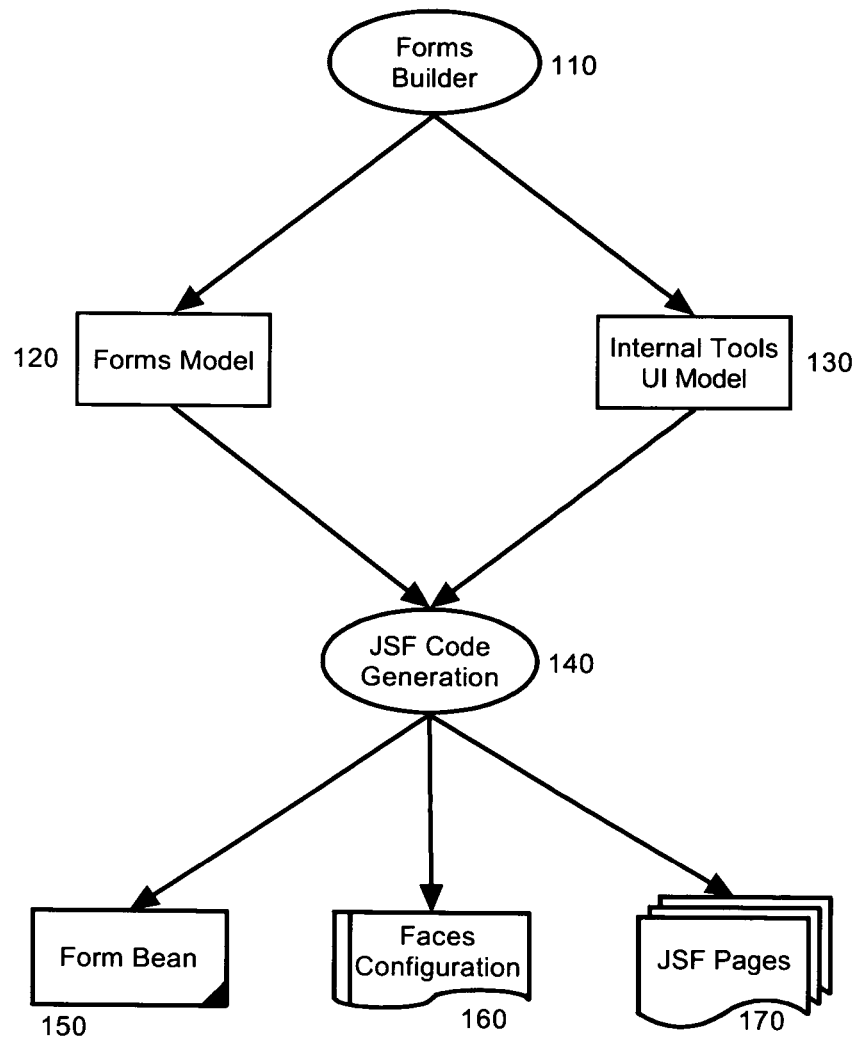
FIG. 1 is a schematic illustration of a data processing system for interleaving XForms with JSF request processing; and, FIG. 2 is a flow chart illustrating a process for interleaving XForms with JSF request processing.

In further illustration, FIG. 1 is a schematic illustration of a data processing system for interleaving XForms with JSF request processing. The system can include a forms builder 110 configured to generate both a forms model 120 and an internal tools user interface model 130. The forms model 120 and the internal tools user interface model 130 can be combined in a single document which can include a forms definition including the specification of one or more name spaces and a data structure for the data to be processed within the form.

The forms model 120 also can include a specification of a command to be invoked for an instance of a portal processing a form based upon the forms model 120. The forms model 120 further can include a specification of a binding for data used by controls within a form based upon the forms model 120. The forms model 120 yet further can include a specification of a submission definition used by an XForms processor to invoke a command and corresponding result logic. Finally, the forms model 120 can include a binding of user interface groupings to actions and action parameters.

An exemplary forms model 120 follows:

```
<forms:forms-def xmlns:forms="urn:www.ibm.com:forms"
      xmlns:ev="http://www.w3.org/2001/xml-events"
      xmlns:xsi="http://www.w3.org/2001/XMLSchema-instance"
      xmlns:xs="http://www.w3.org/2001/XMLSchema"
      xmlns="http://www.w3.org/2002/xforms"
      data_structure="http://www.ibm.com/data_structure.data">
   <model id="form_model">
      <instance src="http://www.myportal.com/get_data"/>
```

-continued

```
   </instance>
   <bind nodeset="@FIELD1" readonly="true( )" id="field_1"/>
   <bind nodeset="@FIELD2" readonly="true( )" id="field_2"/>
      . . .
   <bind nodeset="@FIELDN" readonly="true( )" id="field_n"/>
   <submission id="save"
      action="http://www.myportal.com/save"/:
      <setfocus ev:event="xforms-submit-error" control="error"/>
      <setfocus ev:event="xforms-submit-done" control="conf"/>
</model>
<group id="initial_page">
<group id="initial_page_header">
   <output bind="initial_page_data_output"/>
</group>
<group id="data_group_1">
   <text_area id="text_area_1" bind="field_1">
      <label>@FIELD1@</label>
   </text_area>
   <trigger id="editField1"/>
      <label>@editField1_label@</label>
      <action ev:event="DOMActivate">
         <setvalue ref="/@FIELD1" value="DEFAULT"/>
         <setfocus control="update_field1"/>
      </action>
   </trigger>
</group>
   . . .
<group id="data_group n">
   <text_area id="text_area_n" bind="field_n">
      <label>@FIELDN@</label>
   </text_area>
   <trigger id="editFieldN"/>
      <label>@editFieldN_label@</label>
      <action ev:event="DOMActivate">
         <setvalue ref="/@FIELDN" value="DEFAULT" />
         <setfocus control="update_fieldN" />
      </action>
   </trigger>
</group>
</forms:forms-def>
```

The system can include a JSF code generation module 140. The JSF code generation module 140 can be programmed to process the forms model 120 and the internal tools user interface model 130 to produce each of a form bean 150, a faces configuration 160 and one or more JSF pages 170. The form bean 150 can include getter and setter methods for every binding element, arbitrary data, control properties, event handler and submission in the form. In this regard, the control properties can be an interface having the methods boolean is Relevent( ), boolean is ReadOnly( ), and boolean is Required( ) which are properties that may change as the form performs its processing.

An exemplary form bean follows:

```
class DataChangeBean
{
    FormsContext context = FormsContextFactory.currentContext( );
    /* Getters and setters for every binding element in the form */
    public String getField1 ( )
    {
        return context.getBindingValue("field_1");
    }
    public void setField1 (String field1_data) {
        context.setBindingValue("field_1", field1_data);
    }
    . . .
    /* Getter and setter for arbitrary model data through XPath */
    public Object getInstanceData (String xPath)
    {
        return context.getInstanceValue(xPath);
    }
    public void setInstanceData (String xPath, Object value)
    {
```

```
        context.setInstanceValue(xPath, value);
    }
    /* Control Property getters and setters */
    public ControlProperties getAddr1_inputProps( )
    {
        context.getControlProperties("field1_input");
    }
    ...
    /* Methods for every event handler and submission in the form */
    public String editData_DOMActivate ( )
    {
        formsContext.dispatchEvent("editData", "DOMActivate");
        return formsContext.currentGroup( );
    }
    ...
}
```

The faces configuration 160 can declare the managed bean for the form, a lifecycle phase listener for forms processor integration and navigational rules based upon navigation groups in the form definition. In particular, the responsibility for linking JSF request processing with the forms event processing rests on the lifecycle phase listener. The lifecycle phase listener can prepare the forms processing engine for each phase and the life cycle phase listener can initiate events and processing on the forms side. An exemplary faces configuration file 160 follows:

```
<faces-config>
    <!-- Declare the managed bean for the form -->
    <managed-bean>
        <managed-bean-name>DataChangeBean</managed-bean-name>
        <managed-bean-class>
        generated.DataChangeBean
        </managed-bean-class>
        <managed-bean-scope>request</managed-bean-scope>
    </managed-bean>
    <!-- Lifecycle phase listener for forms processor integration -->
    <lifecycle>
        <phase-listener>
            com.ibm.forms.jsf.PhaseListener
        </phase-listener>
    </lifecycle>
    <!-- Navigation rules based on navi groups in the forms def -->
    <!-- rules for every navigation in portlet -->
        <navigation-rule>
            <navigation-case>
                <from-outcome>initial_page</from-outcome>
                <to-view-id>initial_page.jsp</to-view-id>
            </navigation-case>
            <navigation-case>
                <from-outcome> data_group_1</from-outcome>
                <to-view-id> data_group_1.jsp</to-view-id>
            </navigation-case>
                ...
            <navigation-case>
                <from-outcome> data_group_n</from-outcome>
                <to-view-id> data_group_n.jsp</to-view-id>
            </navigation-case>
        </navigation-rule>
        ...
</faces-config>
```

Finally, each of the JSF pages 170 can be a server page generated for each navigation group defined in the form. Specifically, the server page can specify the initialization of the forms context and the location of the form definition, the binding of each control and its corresponding control properties in the form to the form bean, and action handlers for controls in the form with methods in the form bean. An exemplary fragment from a JSF pages 170 follows:

```
...
<!-- Set up form context and identify bean associated
with form -->
<!-- The initForm tag initializes the context of the
form and use the
src attribute to locate the form definition document -->
<forms:initForm id="DataChangeBean" src="form_model.xml"/>
...
<!-- Each control not only has its value bound to the
form bean, but
also properties (where applicable) to the control properties
from the
bean -->
<h:inputTextarea value="#{DataChangeBean.field_1}"
        readonly="#{DataChangeBean.field_1_Props.readOnly}"
        enabled="#{DataChangeBean.field_1_Props.relevant}"
        .../>
<!-- Action handlers on buttons and links are associated
with methods
on the form bean which in turn dispatch events in the forms
processor->
<h:commandLink
action="#{DataChangeBean.editField1_DOMActivate}"
        rendered="#{DataChangeBean.editField1_Props.relevant}">
</h:commandLink>
...
```

Figure 2:
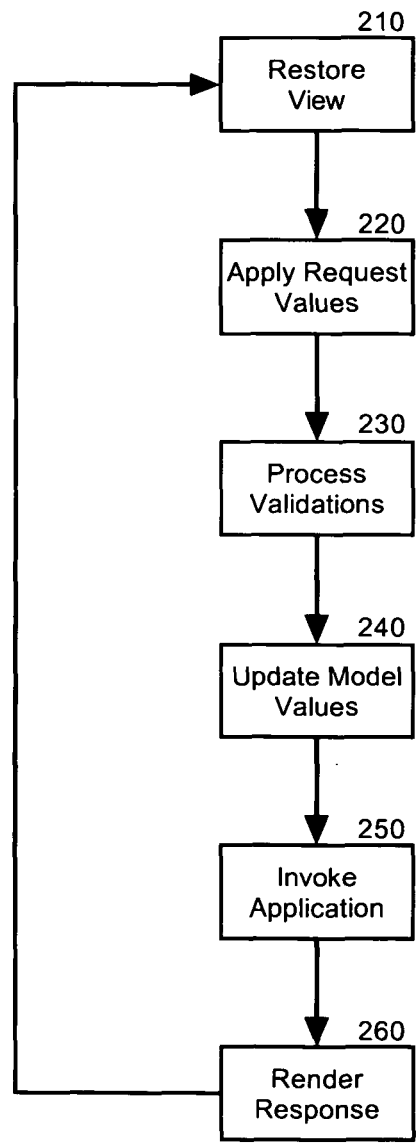

In more particular illustration, FIG. 2 is a flow chart illustrating a process for interleaving XForms with JSF request processing. Beginning in block 210, a non-faces request can be rendered with a JSF server page containing an "initForm" tag resulting in the creation of a forms context. Every following request will have a forms context associated with it. In block 220, the view having been rendered and the view root having become available from the forms context, the lifecycle phase listener can register the forms processor as a validator on any controls bound to forms data. Subsequently, the forms processor can be set to accept control data to prepare for a validations phase and data can be applied to forms control data from any controls that are bound to form data.

In block 230, since the forms processor will have been registered as a validator for controls bound to it, the validator can be called to perform validations on control data. Messages can be generated appropriately and controls can be marked as valid or invalid. In block 240, the form control data will have been validated and values from controls can be applied to the model instance inside the form. In block 250, any event which generates request processing can be dispatched to the forms processor via the form bean. Finally, in block 260, form instance data and control properties can be re-queried during this phase via the form bean.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate or transport the program for use by or in connection with the instruction execution system, apparatus, or device. The medium can be an electronic, magnetic, optical, electromagnetic, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A data processing system for interleaving XForms with Java server faces (JSF) request processing, the system comprising:
    a computer with memory and at least one processor;
    an XForms definition stored in the memory and generated for a form configured for rendering in a Web application, said XForms definition specifying a data model for data to be processed within said form;
    a JSF code generation module registered as a validator for any control in said form which has been bound to data for said form, the module being programmed to process said forms model to produce a form bean, a faces configuration, and a JSF page for each navigable view defined in said XForms definition, the form bean comprising getter and setter methods for every binding element, arbitrary data, control properties, event handler and submission in the form, the module executing in the memory of the computer; and,
    a lifecycle phase listener for forms processor integration, the listener dispatching every event which generates JSF request processing to a forms processing engine through the form bean in response to detecting the event, and
    wherein said faces configuration comprises navigational rules based upon navigation groups in said XForms definition, wherein each JSF page comprises a server page generated for each of said navigation groups, and wherein each generated server page specifies initialization of a forms context and location of said Xforms definition.

2. The data processing system of claim 1, wherein said XForms definition further comprises a plurality of bindings for data used by controls within said form with fields of said data model.

3. The data processing system of claim 1, wherein said XForms definition further comprises statements linking actions in said form with corresponding command invocations.

4. The data processing system of claim 1, wherein said faces configuration specifies said form bean.

5. A method for interleaving XForms with Java server faces (JSF) request processing, the method comprising:
    rendering in a computer a non-faces request to generate a forms context for a form;
    processing a forms model to produce a form bean, a faces configuration, and a JSF page for each navigable view defined in an XForms definition, wherein the form bean comprising getter and setter methods for every binding element, arbitrary data, control properties, event handler and submission in the form;
    registering a forms processor as a validator for any control in said form which has been bound to data for said form;
    accepting data for said form and applying control data for said accepted data; calling said validator to perform validations on said control data for said accepted data; applying said accepted data to a model instance inside said form; and,
    for any event which generates JSF request processing, dispatching the event by a lifecycle phase listener to said forms processor through the form bean in response to detecting the event, and
    wherein said faces configuration comprises navigational rules based upon navigation groups in said XForms definition, wherein each JSF page comprises a server page generated for each of said navigation groups, and wherein each generated server page specifies initialization of the forms context and location of said Xforms definition.

6. The method of claim 5, further comprising re-querying instance data and control properties through said form bean.

7. A computer program product comprising a computer usable storage medium comprising a memory device storing computer usable program code for interleaving XForms with Java server faces (JSF) request processing, said computer program product including:
    computer usable program code for rendering a non-faces request to generate a forms context for a form;
    computer usable program code for processing a forms model to produce a form bean, a faces configuration, and a JSF page for each navigable view defined in an XForms definition, wherein the form bean comprising getter and setter methods for every binding element, arbitrary data, control properties, event handler and submission in the form;
    computer usable program code for registering a forms processor as a validator for any control in said form which has been bound to data for said form; computer usable program code for accepting data for said form and applying control data for said accepted data;
    computer usable program code for calling said validator to perform validations on said control data for said accepted data;
    computer usable program code for applying said accepted data to a model instance inside said form; and,
    computer usable program code for dispatching by a lifecycle phase listener, for any event which generates JSF request processing, the event to said forms processor through the form bean in response to detecting the event, and
    wherein said faces configuration comprises navigational rules based upon navigation groups in said XForms definition, wherein each JSF page comprises a server page generated for each of said navigation groups, and wherein each generated server page specifies initialization of the forms context and location of said Xforms definition.

8. The computer program product of claim 7, further comprising computer usable program code for re-querying instance data and control properties through said form bean.

* * * * *